United States Patent [19]

Mills

[11] E Re. 30,719

[45] Reissued Aug. 25, 1981

[54] DOORWAY SAFETY DEVICE

[76] Inventor: Gerald W. Mills, 163 Arch St., Ramsey, N.J. 07446

[21] Appl. No.: 930,656

[22] Filed: Aug. 2, 1978

Related U.S. Patent Documents

Reissue of:

[64] Patent No.: 4,029,176
Issued: Jun. 14, 1977
Appl. No.: 619,731
Filed: Oct. 6, 1975

[51] Int. Cl.[3] ..... B66B 13/26

[52] U.S. Cl. ..... 187/52 R; 49/25; 367/96

[58] Field of Search ..... 187/1 R, 48, 51, 52 R, 187/52 LC, 56, 58, DIG. 1; 49/25, 26, 27, 28; 340/545; 367/93, 96

[56] References Cited

U.S. PATENT DOCUMENTS

| | | | |
|---|---|---|---|
| 2,900,521 | 8/1959 | Eames | 187/52 R |
| 3,367,450 | 2/1968 | Lester et al. | 187/52 R |
| 3,627,082 | 12/1971 | Berkovitz | 187/52 LC |
| 3,742,434 | 6/1973 | Leyde et al. | 367/96 X |

*Primary Examiner*—James L. Rowland
*Attorney, Agent, or Firm*—Larson and Taylor

[57] ABSTRACT

A safety system for automatically operated sliding panel doors, specifically elevator doors, having acoustic wave transmitters and receivers arranged in a row along the moving door's leading edge. Short bursts of acoustic energy are projected both in front of the door and to one or both sides so as to "sweep" a three-dimensional space, in and near the door's path, representing a zone of potential danger to persons or objects therein. Reflected energy from persons or objects in the danger zone is usable if it is received, following each transmitted burst, during a prescribed time interval representing combinations of the doorway opening distance and other selected parameters, and usable reflections are converted to a control signal to stop and re-open the doors before they strike the endangered person or object.

45 Claims, 6 Drawing Figures

DOORWAY SAFETY DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates broadly to a safety system for protection of persons or objects from injury by being struck by power operated sliding doors. More specifically, it is particularly suitable for use with elevator doors and is presented accordingly.

2. The Prior Art

Protective devices have been proposed from time to time to minimize the danger inherent in automatically operated power sliding doors, where no attendant is present to act as a guard against persons being struck by the doors. The simplest and least effective of these is found on subways and city buses, and consists only of a collapsible rubber bumper along the door edge to cushion the impact when a person is struck or caught. Beyond this non-preventive approach are devices which attempt to prevent injuries by minimizing or eliminating contact between the doors and persons using them.

One such device has commonly been used on elevators in many forms, the so called retractable safety edge. It consists of a strip of rigid material, usually metal, covered at times with rubber or plastic, mounted adjacent to the elevator car door on pivot arms which allow its movement relative to the door. Through various arrangements of mechanical coupling, the safety edge is caused to precede the door edge by a small distance while the door is closing. Subsequent pressure against the device opposite to the direction of closing causes one to two inches of movement relative to the car door, and actuates a switch to effect stoppage and reversal of the door. Variations of the device have sought to refine it (see U.S. Pat. No. 2,687,455) but in substantially all cases the retractable safety edge requires contact with an object in its path in order to work, is easily damaged because it precedes the car door, and is generally poor because the combined inertia of the car door and the hoistway, or building, door coupled to it is often sufficient to carry both doors forward many inches after first contact with the safety edge. Further, the hoistway door is not normally supplied with a safety device, is located 5 to 6 inches apart from the car door, and consequently can strike a person in its own path before that person can engage the safety edge on the car door.

In order to improve the efficacy of the retractable safety edge, various forms of photoelectric light beam controls have been employed along with it, patterned after the methods of U.S. Pat. No. 1,947,079. Persons or objects using the doorway must interrupt a beam of light aimed horizontally across the doorway at some specific height, thus producing an additional control signal to that of the retractable safety edge. It has been the usual practice to position the one or two narrow light beams of this method to operate just outside the car door or, in certain case, just inside. In either situation only moderate improvements in safety have been evident. It has still remained possible for persons or objects to miss the light beams completely, whereupon arms, legs or briefcases are then caught by the door at some height other than that of the light beams. As before, the hoistway door in this situation has remained unprotected.

In recent years several versions of an "electronic" device have been proposed to replace both the retractable safety edge and photoelectric controls. U.S. Pat. No. 2,601,250 and later patents trace the evolution of this device, which employs an antenna-to-ground circuit. The capacitance of the circuit is altered by the influence of some significantly large electrically conductive object brought into close proximity thereto. In theory these devices can be adjusted to respond to a variety of sizes and characteristics of the objects they are to detect, or can be adjusted in sensitivity to control their detection range, or can be adjusted and compensated to nullify effects from variations in hoistway doors, spacing, humidity and similar detrimental factors.

A study of related art covering these "electronic" devices exposes the difficulty of developing a single configuration capable of handling effectively all of the environmental factors necessary for proper operation. The predictable result has been complex and costly mechanisms which require undue care during and after installation and which usually demand extensive changes in existing elevator installations before they can be used to replace older existing safety devices. Further, extending the application of these "electronic" devices to provide protection for the hoistway doors requires fitting out each hoistway door at every building landing with its own additional apparatus. Clearly such systems are not well suited to the majority of situations where protection is needed.

A recent invention covered by U.S. Pat. No. 3,367,450 addresses the problem obliquely by using the Doppler shift in frequency principle to detect whether persons might be moving toward or away from the doorway opening, then using that information to hasten or delay door closing. Unfortunately, the requirement for fairly rapid motion of the person being protected does not cover stationary or slow moving feeble persons, or objects directly within the door opening, and that invention accordingly specifies additional use of some other standard protective device such as the retractable safety edge or one of the "electronic" variety.

In order to improve the general safety of persons using doorways served by powered sliding doors, and specifically to improve both the safety of elevator passengers and other load without undue complexity of equipment or delay in elevator service speed, information must be generated concering the position of persons or objects in or near the doorway path including the path of the associated hoistway door, without regard to whether those persons be moving or still, leaving or entering, electrically conductive or not, but with due regard to whether or not at any point in the door travel they are endangered. Such information is enhanced if the actual distance from the advancing door or doors to the person or object is known, for a person directly in line with the door may not actually be considered as endangered until it moves sufficiently close to him. In commercial office buildings, where speed of service is important and where passengers are predominantly able-bodied adults, this is particularly true and it is important to put the door into motion to herald imminent departure of the car. However, in nursing homes and hospitals the definition of total safety may well require the doors to remain open and unmoving if a person is anywhere within the general doorway, for example, a situation where a feeble person using a walker or crutches timidly approaches the elevator car, or where a stretcher is being moved.

SUMMARY OF THE INVENTION

It is therefore an object of this invention to provide an improved device for preventing injury to persons and objects using a doorway serviced by powered sliding doors.

It is also an object of the invention to provide a means for detecting persons or objects which, by their position in or near the path of a powered sliding door, are endangered by the door.

It is a further object of this invention to provide a means for defining the nature and extent of a zone of danger created in or near the path of a powered sliding door and to exclude from protective consideration persons or objects not within that zone.

It is yet another object of this invention to provide an improved apparatus for detecting substantial objects of any nature without regard to their electrical or physical properties, texture, temperature, color, shape or motion.

Other and further objects will be obvious upon an understanding of the illustrative embodiment about to be described, or will be indicated in the appended claims, and various advantages not referred to herein will occur to one skilled in the art upon employment of the invention in practice.

In accordance with the invention, distance from the car door leading edge to any person or object located in or near the path of either the car door or the hoistway door is continually measured as the doors travel, using the principle of determining distance by measuring time required for acoustic echoes to return to their source from a reflection surface. In a preferred embodiment of the invention ultrasonic acoustic wave energy is projected in short bursts from the leading edge of the car door into a controlled corridor of space embracing the paths of both doors and throughout their vertical height, so as to describe a volume of space defining the danger zone. Following each burst, echoes from objects within the volume are measured against elapsed time and are compared to selected fixed parameters and to the open width of the doorway as the latter changes. Persons or objects that reflect energy within specified time durations are considered to be in the defined danger zone, and the shape and range of this danger zone may be controlled to suit the greater need for speed or the greater need for safety as desired. Pertinent art relating to a somewhat similar echo ranging system using non-moving elements and surfaces, a fixed range, and non-qualitative determinations can be found in U.S. Pat. No. 3,412,390.

The invention contemplates elimination of all other forms of door safety devices discussed previously in that is provides equal or superior safety protection without sacrificing the utility of the elevator car or requiring undue preparations for its use. The invention further contemplates use on vertically sliding panel doors, as might be found on freight elevators, or in non-elevator applications such as supermarkets, terminals and airports.

BRIEF DESCRIPTION OF THE DRAWINGS

A preferred embodiment of the invention has been chosen for purposes of illustration and description and is shown in the accompanying drawings, forming a part of the specification, wherein.

DESCRIPTION OF PREFERRED EMBODIMENT

Figure 1:
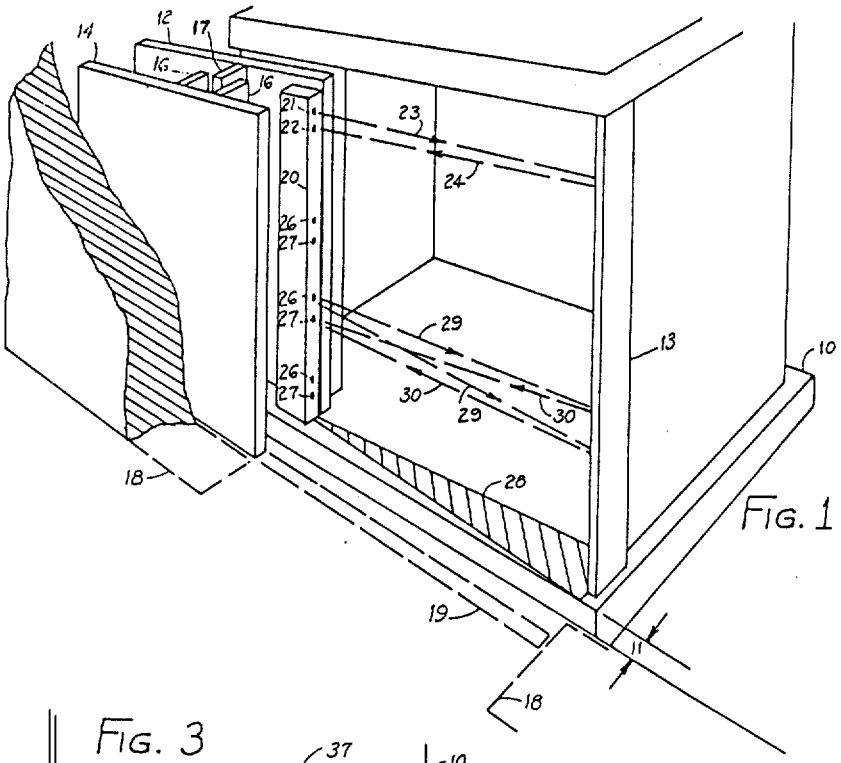
FIG. 1 is a downward isometric view, partly in section, of an elevator doorway showing one portion of the protective features of the invention.

Referring now to the drawings, there is shown in FIG. 1 portions of an elevator doorway pertinent to the present invention. The observer is assumed to be looking downward from a vantage point outside an elevator so as to view a platform 10 of the elevator car, level with a building landing and a space 11 separated from it. The car, constructed on platform 10, has a sliding door 12 suitably arranged to move along a line parallel to the platform front edge and come to rest when fully closed against a strike post 13. Opposite car door 12 is a building, or hoistway, door 14 arranged to move parallel with the car door. On the hoistway door 14 are vanes or clutch plates 16 which interleave with a vane 17 on the car door 12. With this arrangement the elevator car can move vertically without affecting the hoistway door 14. However, any horizontal motion of the car door 12 at a landing results in corresponding motion of the hoistway door 14, and in this way it is possible for the mechanism that opens and closes car door 12 to likewise move hoistway door 14.

It is assumed that the motive means for the car door has some control means which is responsive to input control signals of the type generated by the invention, and that the door motion may be caused to stop, reverse, or go forward, according to standard practices known to the trade, as a result of said input control signals.

To further clarify the invention, dashed lines 18 depict the outlines of portions of the building masonry which form the vertical approachway to the elevator. The nearer of these to the observer also forms a door stop for hoistway door 14, and dashed lines 19 show hoistway door 14 in its closed position.

It will be shown that the purpose of the invention is to detect objects located in or near the path of both door 12 and door 14 and to cause the door operator control means to stop or reverse the door closing process if said objects are endangered by either door.

When both doors are fully closed, pressed tight against their respective strike posts or door stops, they represent no danger to persons or objects. If even a slight opening remains during the closing process, however a hand, foot or small object can become caught between either door and its strike post. Thus, the range of distance through which a protective device should function extends from a mere inch or so to the full opening of the doorway.

Certain variables must be considered in selecting a maximum detection range, beyond merely the size of the door opening. One variable might be, for example, the time required for a floor-to-floor trip by the elevator car. Another variable would be wear and tear on the equipment, which would understandably increase from repeated unnecessary door motion reversals. In view of these types of variables the protective device desirably should not detect objects or persons in the doorway until danger is imminent, allowing the doors to close partway so as to herald the departure of the elevator car and to suggest the speeding up of entry or exit. A detection range of the order of 8 or 10 inches would fulfill the safety goals of the device while keeping things moving.

On the other hand managers of certain buildings such as hospitals and nursing homes or homes for the aged are far more concerned with the total safety and peace of mind of elevator users, without regard to speed or wear and tear, and here the full range of the open doorway desirably would be used to prevent any motion of the doors as long as someone or something was in their path.

Thus the full purpose of the invention is to provide safety protection for persons and objects endangered by the car door or hoistway door in variable situations of its use, requiring in some cases shorter detection range and in other cases longer detection range.

With these goals in mind and referring to FIG. 1, there is shown a columnar element 20 attached to the side of the door 12 flush with its leading edge. As seen thereon, a pair of acoustic wave transducers 21 and 22, designated as distance measuring transmitter and distance measuring receiver, respectively, occupy the uppermost portion of the columnar element 20, substantially higher than a majority of the traffic through the doorway. Transducer 21 is shown above transducer 22, however, the reverse is equally acceptable or a side-by-side arrangement may be used. In a preferred embodiment of the invention both transducers operate most efficiently at 26 KHz. However, there is no specific best frequency for the invention.

Distance measuring transmitter 21 is caused to emit energy in the form of acoustic waves at 26 KHz in short bursts with relatively large time gaps between bursts. The waves travel, or propagate, in air at approximately 1100 feet per second, of 1.1 feet in each millisecond. If this wave energy travelled for 4 milliseconds, for example, struck a reflective surface, and was reflected back to its source, the total time would be 8 milliseconds representing 8.8 feet for the round trip. By transmitting only a short burst of energy and then "listening" for a time thereafter for echoes to return, it is possible to decide the distance of some reflecting object from the transmitter. There is no point in "listening" beyond a certain time limit representing the maximum range of interest, and so a subsequent burst may then be transmitted and the process repeated continually. Whether the transmitter is fixed and the reflecting object moving, or vice versa, or both moving relative to each other, the above principle repeatedly and continually indicates distance to the nearest significant "target" in this way.

The purpose of distance measuring transmitter 21 and distance measuring receiver 22 is to measure the distance to strike post 13 by sending energy along a path 23 to be reflected from the vertical surface of post 13 along path 24 to impinge on receiver 22, by the above method. The farthest possible distance travelled by this energy is equivalent to the maximum door opening width, so that this distance becomes the limiting range of interest for a given doorway. It should be understood that in order to shorten this range of interest, or lengthen it, the time duration allowed for echoes to return is merely shortened or lengthened accordingly. Echoes arriving simultaneously with or after the expiration of the "listening" period are ignored.

Still referring to FIG. 1, there are also shown several second pairs of acoustic transducers 26 and 27, designated as straight detection transmitter and straight detection receiver, respectively, again without regard to placement or order. These comprise only a portion of the total detection function of the invention, this portion being referred to as the straight ahead direction, and their purpose is to measure the distance to objects positioned substantially in line with car door 12. Cross-hatched area 28 of FIG. 1 shows the approximate shape of the energy path belonging to transmitters 26 and receivers 27, as if projected shadow-fashion [against shadow-fashion] against *the* floor [or] *of* the elevator car. As shown, more than one pair of transducers 26 and 27 may be used for this purpose. In FIG. [2] *1* three such pairs, 26 and 27, are indicated for purposes of illustration and are positioned in the drawing to imply their distribution throughout the lengthwise dimension of columnar element 20.

Energy from each transmitter 26 travels along path 29 in a diverging pattern until it reaches the vertical strike post 13. If no intervening object is positioned in the energy path, a reflection from strike post 13 will return generally along path 30 to impinge on receiver 27 at precisely the same instant when similar reflected energy within path 24 impinges on receiver 22, but the action of transmitter 21 and receiver 22, as previously described, will negate the effect of reflected energy at receiver 27 by prohibiting its use in further processing. The arrival of any reflected energy from objects some "lesser distance" away will, however, be allowed as usable reflections representing objects located between the columnar element 20 and strike post 13.

It should be understood that the term "lesser distance" in the preceeding sentence refers to differences as small as fractions of an inch between the distance to the reflecting objects and the comparative distance to strike post 13, and it is only when these two distances are exactly equal or when the distance to the reflecting object is greater than the distance to strike post 13 that the action of transmitter 21 and receiver 22 intervenes to discard the received reflection signals. Thus, even an object the thickness of a person's hand, held flat against strike post 13, presents a reflecting surface closer to the columnar element 20 that strike post 13 and produces a usuable reflection.

Factors other than the distance to strike post 13 will be shown to further control and modify the status of reflected energy which is otherwise usable, later in the discussion.

Figure 2:
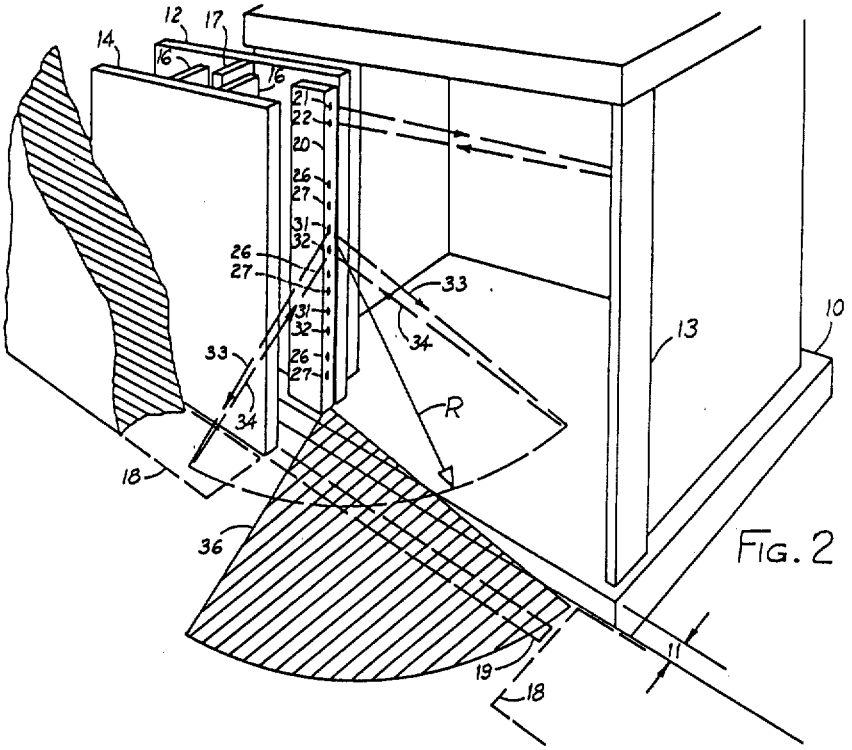
FIG. 2 is a view similar to FIG. 1 but showing the remaining protective features of the invention, presented separately for clarity.

Referring now to FIG. 2, another pair of acoustic transducers 31 and 32 is shown, designated as angled detection transmitter and angled detection receiver, respectively, once again without regard to placement or order. These comprise the remaining portion of the total detection function of the invention, this portion referred to as the angled direction, and their purpose is to measure the distance to objects located alongside the path of car door 12, either within the space between doors 12 and 14 or directly in the path of hoistway door 14, as illustrated by shaded area 36, shown shadow-fashion against the floor. The energy transmitted from transmitter 31 is aimed in a broadly divergent pattern at an angle to the path of car door 12, so that a majority of the area outside of the elevator car and including the path of hoistway door 14 is reached. While there may be many pairs of transducers 31 and 32 used in an embodiment of the invention, there must be at least one pair thereof. In FIG. 2 two such pairs are indicated for purposes of illustration and are shown to imply their distribution along the length of columnar element 20, perhaps interspersed with transducer pairs 26 and 27 previously described.

Energy from each transmitter 31 travels generally along a divergent path 33 until it strikes some object positioned in its path, whereupon reflected energy returns generally along path 34 to impinge on receiver 32. If the reflected energy arrives at receiver 32 prior to any limiting action of transmitter 21 and receiver 22, as previously discussed, the object causing a reflection must be located a distance less than the distance from the columnar element 20 to strike post 13, and is usable. The effect of the limiting action of transmitter 21 and receiver 22 is to describe a radius R equal to the width of the doorway opening, with origin at the columnar element 20, sweeping an arc of limitation through space beyond which no objects will be detected. As the door closes, this radius R decreases until at full closure it is zero. Detection of an object remains possible as long as the object falls within the radius R and either in Zone 28 of FIG. 1 or Zone 36 of FIG. 2, no matter how small the remaining opening may be. Further it becomes impossible for a person or object to enter or leave the elevator car without crossing either zone.

Figure 3:
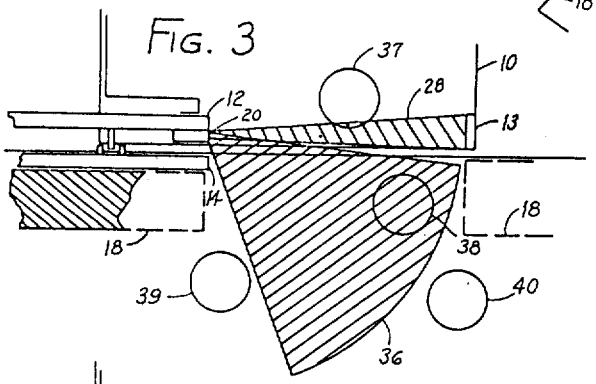
FIG. 3 is a plan view, partly in section, showing the elements of FIG. 1.

In FIG. 3 there is shown a plan view of the elevator entrance from a vantage point directly overhead. Objects 37, 38, 39 and 40 are placed in the entrance to demonstrate the effect of both the straight direction and angled direction functions performed by transducer pairs 26 and 27 and by transducer pairs 31 and 32. It can be seen that object 40 and the building masonry outline 18 nearest strike post 13 both fall outside the effective radius R as determined by transmitter 21 and receiver 22 of FIG. 1 and will therefore not be detected as targets. Object 39 reflects no energy at all and is therefore excluded. Objects 37 and 38 will be detected, however, as they intersect the defined danger zones 28 and 36.

Figure 4:
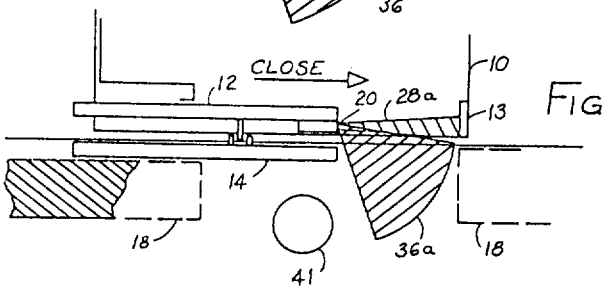
FIG. 4 is a plan view, partly in section, showing the elements of FIG. 1 following their displacement from the starting door-open position.

In FIG. 4, zones 28 and 36 have contracted to become zones 28a and 36a due to the closing motion of door 12. Object 41 clearly must pass through both zones to enter the elevator car. Building masonry 18 nearest strike post 13 remains outside the effective radius R of zone 36a and therefore is not detected as a target even though it is undoubtedly reflecting energy in the angled direction.

In all of the preceding discussion it has been assumed that zones 28 and 36 of FIG. 1 and FIG. 2 are extended to their maximum limit as determined by the action of transmitter 21 and receiver 22. This is a desirable case where doorway protection is being provided in nursing homes, hospitals and the like. However, extension of these zones accordingly adds undesirably to the floor-to-floor time of the elevator in situations where speed of service is essential, such as in office buildings, for the detection of an object anywhere within the combined zones of protection results in re-opening of the door or prevention of further closing action as long as the object is in range.

Figure 5:
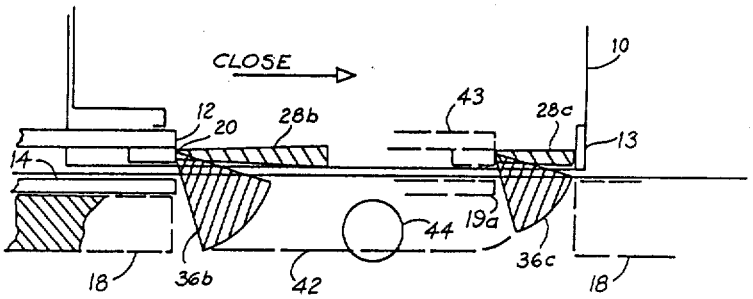
FIG. 5 is a plan view, partly in section, of the elements of FIG. 1 showing the effects of range control.

In order to alleviate this predicament, this invention provides for individual control of the effective range of zone 28 and zone 36 of FIG. 1 and FIG. 2 to some limit smaller than the width of the doorway opening. This is accomplished by setting up time limits measured from the beginning of each transmission burst to a point represented by elapsed time whereafter no reflections will be considered as usable. FIG. 5 illustrates zones 28b and 36b, each shorter than the full doorway opening, and different from each other. It will be seen that zone 36b still extends across path 19 of hoistway door 14, FIG. 2, and so spreads energy in front of door 14 as in previous examples. Dashed line 42 shows the outer-most limit of the path of zone 36b as both doors progress to a position, near strike post 13, depicted by dashed lines 43 and 19a. It can be seen that object 44 may remain stationary, as shown, without being detected until such time when door 12 has advanced a considerable percentage of the doorway opening, whereupon object 44 will eventually fall within zone 36b and be detected. It will be seen further that zone 28b and zone 36b remain at their set range limits until such time when, due to door travel, those limits become equal to or larger than the actual doorway opening, as determined by transmitter 21 and receiver 22, whereafter they become contracted to effective limits as shown by zones 28c and 36c, less than radius R as previously discussed, and will continue to be contracted until they become zero at full door closure.

Therefore, this invention is provided with user-selected controls for the effective detection ranges of both straight ahead zone 28 and angled zone 36. It allows doors 12 and 14 to proceed as long as an object in their paths is beyond the selected ranges of imminent danger, until each selected range in its turn is modified by the overriding limit of actual doorway opening width, radius R of FIG. 2.

Throughout the preceding discussion strike post 13 has been the vehicle of reflection for the energy of transmitter 21, simply because in the example of an elevator doorway it is there as part of the door frame and presents a convenient vertical surface of sufficient area to produce good reflections. The use of strike post 13 in the example should in no way limit the invention to doorways with similar strike post arrangements, for the same effect can be produced by any suitable area arranged in line with the energy from transmitter 21. In the case of an elevator which has so-called center parting doors, for example, car door 12 exists as two separate panels moving in opposite directions and coming together at the vertical centerline of the doorway. Hoistway door 14 is arranged similarly. A suitable reflecting surface mounted flush with the leading edge of the opposing door will serve the same purpose as did strike post 13 in that it will identify the farthest limits of the doorway opening at all times.

A further example might be elevators of the freight variety utilizing panel doors which open vertically. Here the invention might be arranged horizontally on the upwardly opening car door so that its acoustic energy radiated downward. The floor would become the equivalent of strike post 13 in the case of a single door arrangement. In the case of center parting vertically moving doors, some suitable reflecting surface might be attached in appropriate fashion to the opposing door to duplicate the function of strike post 13.

Figure 6:
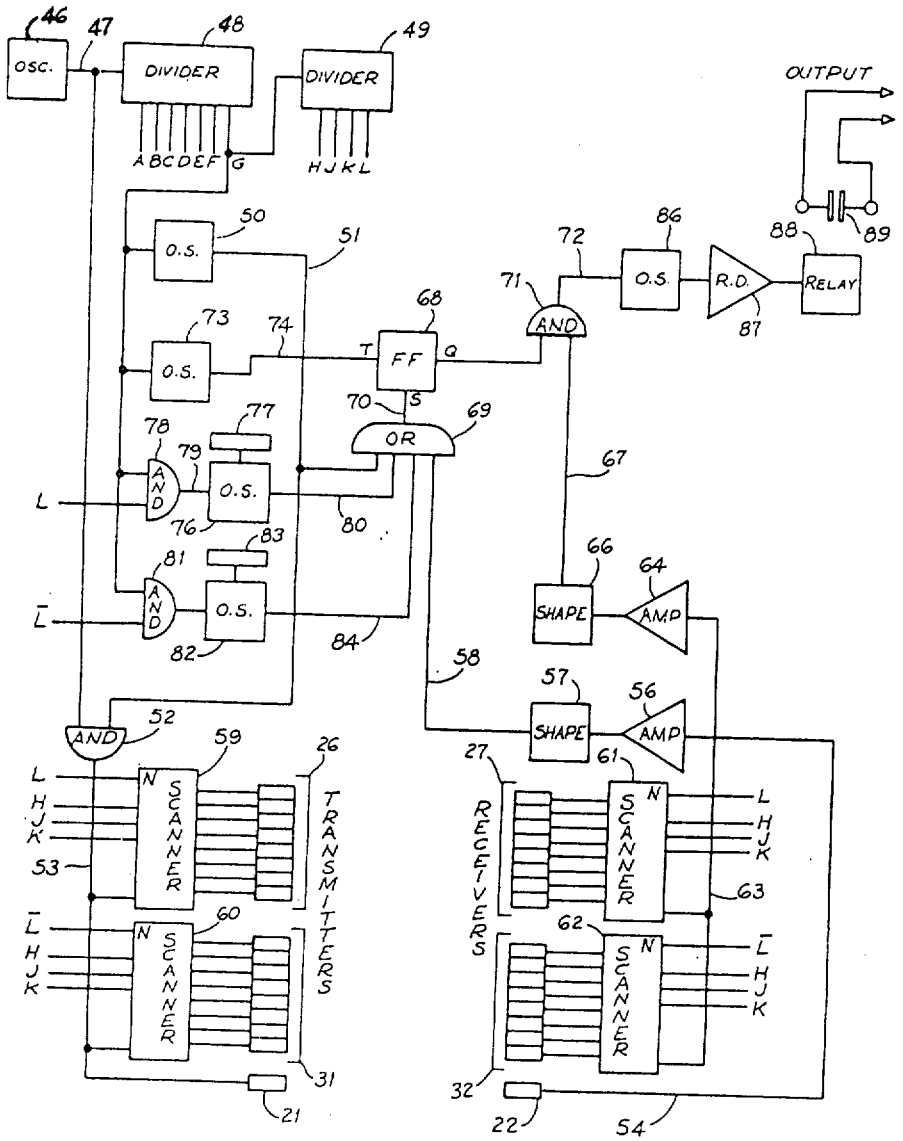
FIG. 6 is a logical schematic diagram showing functional circuit arrangements of one embodiment of the invention.

Further details and understanding of the invention will now become apparent through discussion of the successful embodiment which has formed the basis of this application. FIG. 6 illustrates in a functional way how the desired operation of the invention may be accomplished, using where possible generic functional names of various logical elements which are well known in varieties of form. Also, an embodiment of the invention need not be limited to any singular discipline but may use combinations of disciplines, such as electronics, electromechanics, pneumatics or hydraulics. The embodiment discussed has been accomplished using electronic and electromechanical forms.

Referring to FIG. 6, oscillator 46 is a source of continuous alternating signals which for illustration purposes may be set equal in frequency to the chosen acoustic frequency of the transmitters and receivers used. In the present case, output 47 of oscillator 46 is 26 KHz and of a shape commonly referred to as a square wave. Output 47 is directed to a frequency divider chain 48 containing seven successive sections, or stages, each of which has an output frequency exactly one half of its input frequency. Divider chain 48 therefore presents at its outputs, A, B, C, D, E, F, and G subdivisions of input signal 47, such that output A is 13 KHz, B is 6.5 KHz, C is 3.25 KHz, D is 1.625 KHz, E is 812½ Hz, F is 406¼ Hz, and G is 203⅛ Hz. Any frequency 47 chosen to be other than 26 KHz changes outputs A through G accordingly. This type of division of frequency is called binary. The nature of outputs A through G is such that two polarities, or states, are used to represent information of the sense true-false, yes-no, up-down or any set of dual meanings of special significance to the user. In this discussion the sense OFF-ON is satisfactory and is used throughout.

Further, where a given term such as a letter symbol is used, such a designation is merely a name for the signal, nothing more. Further still, the use of a bar symbol over any letter designation, such as [A or G] $\bar{A}$ *or* $\bar{G}$ signifies that the signal is doing exactly the inverse of a concurrent signal A or G respectively. If A is ON, [A] $\bar{A}$ must be OFF. If [A] $\bar{A}$ is ON, A must be OFF.

Returning to FIG. 6, output G of 48 proceeds to a second binary divider 49 to produce outputs H at approximately 102 Hz, J at 51 Hz, K at 25½ Hz and L at 12¾ Hz. Dividers 48 and 49 have been shown as separate functions here for clarity. In reality, they are simply eleven successive binary division stages.

As discussed earlier, the operation of the invention depends on the continuous transmission of short bursts of acoustic energy at a frequency of 26 KHz, in one case from transmitter 21 and in the other case from transmitters 26 and 31, as shown in FIGS. 1 and 2. Following each burst is a "listening" period, and for illustration this is chosen to be about 5/1000 second, or 5 milliseconds, representing a distance of approximately 33 inches of range maximum.

It will be observed that since output G of divider 48 is about 200 Hz, each cycle is 1/200 second, or 5 milliseconds. Output G is therefore selected to become the master timing signal for the operation. Each burst of frequency begins precisely at a known condition of G and defines the need of a preceding listening period. Output G is routed to the input of delay one shot 50 wich triggers to produce at its output 51 an ON condition of short duration, and 51 is routed to AND gate 52 to become an input. The remaining input to AND gate 52 is signal 47, which is the 26 KHz signal. The operation of AND gate 52 is as follows: when signal 51 is ON, signal 47 is presented intact at output 53, and when signal 51 is OFF, output 53 is blank.

Thus, during the short interval when output 51 of one shot 50 is ON, output 53 of AND gate 52 is the desired 26 KHz signal. A short burst of the 26 KHZ signal has been created just following the end of a listening period, to start a new cycle under control of signal G. Signal 53 is routed to transmitter 21.

Transmitter 21 may be any form or variety of ultrasonic transducer suitable for the purpose, as the general field of ultrasonic transduction is well known and the invention is not restrictive in this area. Ceramic piezoelectric devices are well suited to the application and are capable of producing good signals from low voltage electrical signals. In the example, output 53 is directly applied to transmitter 21 which produces acoustic waves at a frequency of 26 KHz for the duration of time that signal 51 is ON.

Similarly, receiver 22 is selected from the many forms of ultrasonic sensory devices to create electrical signals from impinging acoustic energy, and in the example receiver 22 receives reflected energy desirably from strike post 13, FIG. 1. Output 54 of receiver 22 is routed to an amplifier 56 and squaring circuit 57. The function of squaring circuit 57 is to transform any signal from amplifier 56, sufficiently large to be identified as a true signal, into a uniform pulse of standard voltage levels for use in the ON-OFF sense as previously described. A generic term for such a device as squaring circuit 57 is the Schmitt Trigger, which can be adjusted to produce an ON condition only when its input is above a given threshold level of voltage, and is OFF for all lesser input levels. Thus the output 58 of squaring circuit 57 changes from OFF to ON at precisely the instant when sufficiently strong acoustic energy impinges on receiver 22. If said energy results from reflections from strike post 13 of FIG. 1, then signal 58 represents the point in time, following frequency burst 53, equivalent to the distance from transmitter 21 to strike post 13 and back to receiver 22. This point in time defines the end of the maximum "listening" interval.

In a like fashion, signal 53 is used to create acoustic energy bursts in transmitters 26 and 31. Although the minimum number of these transmitters in any given embodiment of the invention is one of each, a higher number of each is contemplated and in this example eight of each have been shown. There would therefore be eight transmitters 26 operating in the straight detection mode and eight transmitters 31 operating in the angled detection mode. It is further contemplated that just one of these at a time will be caused to generate an acoustic energy burst, followed successively by each remaining transmitter in its turn until all have been used, and the process repeated. Corresponding receivers 27 and 32 are similarly employed in step with their counterparts. This process is sometimes termed scanning, and the device which sequentially connects many devices to a single wire or vice versa may be called a scanner. In binary-based electronic systems, such as this example, a scanner is often equipped with a set of control connections intended for control signal inputs which are binary subdivisions of each other, with frequency ratios of 4, 2, 1. The device internally converts these control signals into commands for proper sequencing, and for each distinct combination of binary input signals the scanner connects an appropriate information signal to a common terminal point. A very simple illustration of such a device might be a rotary switch such as used in selecting television channels.

In FIG. 6, signal 53 is accordingly routed also to scanners 59 and 60, each with eight information signal input "channels", whose purpose is to connect signal 53 sequentially to eight transmitters 26 and eight transmitters 31 respectively. Each scanner is controlled by binary frequency signals H, J and K from frequency divider 49. Further, each scanner is supplied with an inhibiting input N such that when any signal at the inhibit input is ON, the scanner outputs are all blank. Signal L of divider 49 and its opposite sense signal [L] $\bar{L}$ perform the function of inhibiting first one scanner, then the other, thus shifting signal 53 from the straight detection transmitters 26 to the angle detection transmitters 31 in alternating fashion. Each transmitter 26 is connected to signal 53 one time before scanner 59 is inhibited, whereupon each of the transmitters 31 is connected to signal 53 one time before the process repeats. It must be remembered that between each burst of frequency of signal 53 is a listening period.

In a like fashion, receivers 27 and 32 are connected through scanners 61 and 62 to signal line 63. These scanners operate now in the reverse sense but are otherwise identical to scanners 59 and 60. Since all four scanners are controlled by identical input signals from binary divider 49, they are always in step. Any signal representing received acoustic energy from receivers 27 or 32 is therefore routed to amplifier 64 and squaring circuit 66 during the listening period for that receiver-transmitter pair selected by the scanners, is amplified and shaped as previously described, and becomes output 67.

Output 67 then represents the occurrence of reflected energy from an object. It remains to identify the relationship between the time of occurrence of signal 67 and the several factors which govern whether it may be interpreted as having arrived from an object endangered by the doors, as previously explained, for though a reflection from some object has been received and amplified during a listening period, nothing further is known about it.

Flip-flop 68 is an element responsible for controlling the length of each listening period. Its operation is such that for every appropriate signal transition at its input T, output Q changes to the alternate of two stable states. If Q is ON and transition occurs at T, [O] *Q* will go OFF. If Q is OFF and a transition occurs at T, Q will go ON. A remaining input S is used to restore the device to a given state at output Q regardless of the state of input T. When S is ON, output Q is OFF and remains OFF after S returns to OFF until a subsequent input transition at T.

It may be seen that output 51 of delay one shot 50, used to produce the burst of frequency in conjunction with AND gate 52, also is routed to an input of OR gate 69. This gate is a logic element whose output 70 is ON if any one of its inputs is ON, and whose output is OFF only when all of its inputs are OFF. Consequently signal 51 causes output 70 of gate 69 to be ON for the duration of each frequency burst and forces output Q of flip-flop 68 to the OFF condition through the action of input S. Q is used as an input to AND gate 71, whose remaining input is signal 67 representing reflected energy from some receiver-transmitter pair 27-26 or 32-31. Consequenly, AND gate 72 is blocked during the burst of frequency period, and its output 72 is blank.

It is desired to begin the listening period as soon as the burst of frequency has propagated away from the immediate vicinity of any transmitter 26 or 31 sufficiently far so as to have escaped from the physical structure of the columnar element 20. Delay one shot 73 is set to produce a signal 74 whose duration exceeds that of one [shop] *shot* 50 by a small amount of time equal to said escape time. Since both one shot 50 and one shot 73 begin their respective intervals together with signal G, it follows that signal 74 lasts slightly longer than signal 51. The transition of signal 74 back to its original state at the end of its ON time triggers flip-flop 68 at input T and, since signal 51 is by then OFF, signal 74 is allowed to change output Q of flip-flop 68 to the ON condition. The listening period has begun, and AND gate 71 will now reproduce intact at output 72 all of the information on line 67.

The end of a listening period is controlled by output Q of flip-flop 68 returning to its OFF state. In one case, already discussed, signal 58 represents energy reflected from strike post 13 of FIG. 1 and signifies the radial distance R of FIG. 2. Reflected energy from objects further away than R are to be rejected by the invention, accomplished by ending the listening period at precisely the instant when signal 58 operates through OR gate 69 to return Q to its OFF condition.

It can be seen that signal 67 will be able to pass intact through AND gate 71 only if it should occur prior to signal 58. Any simultaneous occurrence of signals 67 and 58 will result in signal 58 negating signal 67 by shutting off AND gate 71. Thus any object responsible for usable reflected energy represented by signal 67 must be positioned in the doorway some distance from columnar element 20 less than the distance represented by signal 58, or radius R of FIG. 2. If no reflected energy is received to produce signal 58, then the listening period will continue until the start of a subsequent frequency burst, whereupon output Q of flip-flop 68 is automatically returned to its OFF state by signal 51 as described.

There remains to be explained those provisions exemplified by FIG. 5 wherein individual discrete time periods representing operating range may be selected for the straight detection function and for the angled detection function, and these may differ in value.

Delay one shot 76 is provided with adjustment element 77 which can be set to govern the time period of one shot 76, following input G, that its output is ON. Element 77 is available to the user. Further, AND gate 78 is controlled by signal L at one input to allow remaining input signal G to pass through intact only while L is ON, and this action corresponds to the time period when straight ahead scanners 59 and 61 are functioning. Output 79 of AND gate 78 starts one shot 76 at the beginning of each frequency burst when signal L is ON, and output 80 of one shot 76 is arranged to turn OFF for an interval thereafter, as selected with element 77. The selected time duration would desirably fall short of that time representing the full doorway opening. At the conclusion of this selected interval, output 80 returns to its ON state and resets flip-flop 68 through OR gate 69, as discussed previously. It should be understood that the earliest reset signal arriving at OR gate 69, following the action of signal 74 to begin a given listening period, will end the same listening period by resetting flip-flop 68 at its input S. Referring to FIG. 5 and in view of the preceding, zone 28b has been shown set to some maximum range less than the distance to strike post 13, through the combined operation of AND gate 78, one shot 76, adjustment 77, OR gate 69 and flip-flop 68. The action of these combined elements occurs prior to any action due to signal 58 representing reflections from strike post 13, and therefore cuts zone 28b short as shown. However, as door 12 approaches strike post 13 there is always some point when signal 58, a variable with door position, occurs before signal 80, a fixed time period independent of door position. When door 12 is closer to strike post 13 than the distance selected to create zone 28b, signal 58 is indeed earlier than signal 80. The listening period is thereafter controlled totally by signal 58, until the doors have closed fully.

In like manner, AND gate 81, one shot 82, adjustment element 83 and signal 84 are employed during the duration of [L] *L* to govern the maximum range of the angled detection function.

Thus the presence of any signal 72 at the output of AND gate 71 signifies reflected energy from some object either within the selected range of zone 28 or within the selected range of zone 36 or within the radius R as determined by transmitter 21 and receiver 22, when R is smaller than the selected range of either defined zone. Since these three parameters represent by definition conditions of imminent danger to persons or objects in the path of either door 12 or door 14, any signal 72 must result in a control output signal from the invention to cause the door motive means to stop and reverse its closing action. A typical control output signal for such a purpose might be a switch closure produced by a relay. Accordingly, the remainder of FIG. 6 shows one shot 86 used to create a relatively long duration signal of uniform shape from the sometimes long or sometimes short signals on line 72. Relay driver 87 uses the shaped output to energize a relay 88, whose contacts 89 are presented as terminations of the invention suitable for the use described.

It is to be understood that all of the elements of FIG. 6 have been presented as idealized generic devices and that provisions for any impedance matching, polarity inversion, amplification or wave shaping may be employed as required by the choice of elements used. While a frequency of [27] *26* KHz has been used in the illustration, any inaudible acoustic frequency may be employed without affecting the principles described herein, and other embodiments and applications are within the spirit and scope of the invention.

It is further to be understood that the preceding illustration of the invention presented two distinct portions of its detection function, as represented by transmitter/-receiver pairs 26 and 27 and by transmitter/receiver pairs 31 and 32, in order to create a step-by-step description of the complete detection function. Transmitter/-receiver pairs 26 and 27 of FIG. 1 may be eliminated from the invention without loss of function, as long as at least one of transmitter/receiver pair 31 and 32 is employed as described.

What I claim is:

1. In an elevator system, a structure including a hoistway having one or more landings, a hoistway door for each landing, an elevator car arranged for movement in said hoistway from one to another of said landings, said car having a door movable from an open position to a closed position against a strikepost, means for opening and closing said car door, mechanical means for coupling said hoistway door to said car door so that both doors move concurrently from an open position to a closed position or vice versa, the improvement which comprises electrical means for sensing and being responsive to objects in a predetermined zone at any position of the car door, whereby upon detecting an object in said zone said opening and closing means is energized to prevent further closure of said car door, said sensing means including transmitting and receiving means for locating a leading edge of the car door relative to the strike post, and second transmitting and receiving means positioned at a predetermined angle on the leading edge of the car door in cooperation with said locating means for detecting objects at an angle with respect to an outside surface of the car door during movement of the car door.

2. In an elevator system according to claim 1, including third transmitting and receiving means in cooperation with said [distance measuring] *locating* means and said object detecting means for detecting objects substantially in direct line of movement of the car door.

3. In an elevator system according to claim 2, wherein all of said transmitting and receiving means are carried by said car door, each of said transmitting and receiving means constituting at least a single pair and each of said pairs being spaced along a leading edge of said car door.

4. In an elevator system according to claim 2, wherein all of said transmitting and receiving means are carried by said strike post, each of said transmitting and receiving means constituting at least a single pair and each of said pairs being spaced along a meeting edge with said car door.

5. In an elevator system according to claim 2, wherein said car door and strike post are constituted by two panels moving toward each other to a closed position and away from each other to an open position, wherein all of said transmitting and receiving means are carried by one of said panels, wherein the other of said panels carries a reflecting element, each of said transmitting and receiving means constituting at least a single pair and each of said pairs being spaced along a meeting edge of said one panel.

6. In an elevator system according to claim [3] *1*, including means for providing each of said transmitting means with acoustic wave energy, and means for each of said receiving means for receiving reflection of said transmitted acoustic energy.

7. In an elevator system according to claim 6, wherein said acoustic wave energy is constituted by a series of short bursts of acoustic wave pulses of a single predetermined frequency with comparatively large time gaps between bursts.

8. In an elevator system according to claim 7, wherein said wave energy of said second transmitting means travels along a diverging pattern.

[9. In an elevator system according to claim 7, including means for establishing said time gap between bursts provided by said first transmitting means.]

10. In an elevator system according to claim [9,] *7, including means for establishing as a timing signal said time gap between bursts provided to said first transmitting means; and* including means for rendering said second transmitting and receiving means effective upon detection of an object in its path in preventing closure of said car door when signal received from said preceding object occurs before expiration of said time gap and said timing signal.

11. In an elevator system according to claim 10, including means for varying said predetermined zone for operation of said second transmitting and receiving means.

12. In an elevator system accordng to claim [9,] *7, including means for establishing as a timing signal said*

*time gap between bursts provided to said first transmitting means; and* including means for rendering said third transmitting and receiving means effective upon detection of an object in its path in preventing closure of said car door when signal from said preceding object occurs before expiration of said time gap of said timing signal.

13. In an elevator system according to claim 12, including means for varying said predetermined zone for operation of said third transmitting and receiving means.

14. The method of detecting presence of an object positioned in the path of an elevator door which comprises the steps of transmitting short bursts of acoustic wave energy from a leading edge of a moving car door towards a strike post and receiving reflections of said acoustic energy from said strike post or said object in said door path, the first step of which consists in transmitting and receiving said acoustic energy in a straight path as a timing signal, that is, the time taken for passage of the energy from the car door to the strike post and then back to the car door, the second step of which consists in transmitting and receiving said acoustic energy in a straight path for detection of an object in its path, and the third step of which consists in transmitting and receiving said acoustic energy at an angle with respect to line of movement of the car door for detection of an object in its angular path, whereby should the reflected acoustic energy of either the second step or third step be received prior to the duration of the timing signal of the first step, as indicative of detection of an object, the moving car door will be stopped and returned to its fully open position in accordance with accepted elevator practice.

*15. A safety system for preventing the full closure of an automatically operated sliding door, the door being movable from an open position to a closed position against a strike post and having a leading edge, said safety system comprising:*

*electrical means for sensing and being responsive to objects in a predetermined zone at any position of the door, whereby upon detecting an object in said zone said electrical means generates a signal for preventing further closure of the door, said electrical means comprising:*

*locating means for locating a leading edge of the door relative to the strike post; and*

*first transmitting and receiving means positioned at a predetermined angle on the leading edge of the door in cooperation with said locating means for detecting objects in said predetermined zone.*

*16. A safety system as claimed in claim 15, wherein said predetermined angle is an angle measured between the object and an outside surface of the car door during movement of the car door, said angle being substantially greater than zero.*

*17. A safety system as claimed in claim 16 and further including a second transmitting and receiving means in cooperation with said locating means; and wherein said second transmitting and receiving means is for detecting objects substantially in direct line of movement of the door.*

*18. A safety system as claimed in claim 15, including means for providing each of said transmitting means with acoustic wave energy that is constituted by a series of short bursts of acoustic wave pulses with comparatively large time gaps between bursts, and means for each of said receiving means for receiving reflection of said transmitted acoustic energy.*

*19. A safety system as claimed in claim 18, wherein said wave energy of said first transmitting means travels along a diverging pattern.*

*20. A safety system as claimed in claim 18 and further including means for rendering said first transmitting and receiving means effective upon detection of an object in its path in preventing closure of the door only when the signal received from that object occurs before expiration of a time interval determined by said locating means such that said time interval is the time necessary for said acoustical energy to travel twice the distance between said door leading edge and said strike post.*

*21. A safety system as claimed in claim 20 and further including means for varying said predetermined zone for operation of said first transmitting and receiving means.*

*22. A safety system as claimed in claim 21 wherein said predetermined angle is an angle measured between the object and an outside surface of the car door during movement of the car door, said angle being substantially greater than zero;*

*and further including a second transmitting and receiving means in cooperation with said locating means; and wherein said second transmitting and receiving means is for detecting objects substantially in direct line of movement of the door, said rendering means also rendering said second transmitting and receiving means effective when the signal received thereby from a detected object occurs before expiration of said time interval.*

*23. A safety system as claimed in claim 15 wherein said predetermined angle is determined such that said first transmitting and receiving means detects objects substantially in direct line of movement of the door.*

*24. A safety system as claimed in claim 15 wherein said locating means includes a further transmitting and receiving means.*

*25. In an elevator system, a structure including a hoistway having one or more landings, a hoistway door for each landing, an elevator car arranged for movement in said hoistway from one to another of said landings, said car having a door movable from an open position to a closed position against a strike post, means for opening and closing said car door, mechanical means for coupling said hoistway door to said car door so that both doors move concurrently from an open position to a closed position or vice versa, the improvement which comprises electrical means for sensing and being responsive to objects in a predetermined zone at any position of the car door, whereby upon detecting an object in said zone said opening and closing means is energized to prevent further closure of said car door, said sensing means comprising locating means for locating a leading edge of the door relative to the strike post; and first transmitting and receiving means positioned at a predetermined angle in the leading edge of the car door in cooperation with said locating means for detecting objects in said predetermined zone.*

*26. In an elevator system as claimed in claim 25 wherein said locating means is for detecting objects at an angle substantially greater than zero with respect to an outside surface of the car door during movement of the car door.*

*27. In an elevator system as claimed in claim 26 and further including a second transmitting and receiving means in cooperation with said locating means; and wherein said second transmitting and receiving means is for detecting objects substantially in direct line of movement of the door.*

*28. In an elevator system as claimed in claim 26 and further including means for providing each of said trans-*

*mitting means with acoustic wave energy that is constituted by a series of short bursts of acoustic wave pulses with comparatively large time gaps between bursts, and means for each of said receiving means for receiving reflection of said transmitted acoustic energy.*

*29. In an elevator system as claimed in claim 28 and further including means for rendering said first transmitting and receiving means effective upon detection of an object in its path in preventing closure of the door only when the signal received from that object occurs before expiration of a time interval determined by said locating means such that said time interval is the time necessary for said acoustical energy to travel twice the distance between said door leading edge and said strike post.*

*30. In an elevator system as claimed in claim 29 and further including means for varying said predetermined zone for operation of said first transmitting and receiving means.*

*31. In an elevator system as claimed in claim 30 and further including a second transmitting and receiving means in cooperation with said locating means; and wherein said second transmitting and receiving means is for detecting objects substantially in direct line of movement of the door, said rendering means also rendering said second transmitting and receiving means effective when the signal received thereby from a detected object occurs before expiration of said time interval.*

*32. In an elevator system as claimed in claim 25 wherein said predetermined angle is determined such that said first transmitting and receiving means detects objects substantially in direct line of movement of the door.*

*33. In an elevator system as claimed in claim 32 and further including means for providing each of said transmitting means with acoustic wave energy that is constituted by a series of short bursts of acoustic wave pulses with comparatively large time gaps between bursts, and means for each of said receiving means for receiving reflection of said transmitted acoustic energy.*

*34. In an elevator system as claimed in claim 33 and further including means for rendering said first transmitting and receiving means effective upon detection of an object in its path in preventing closure of the door only when the signal received from that object occurs before expiration of a time interval determined by said locating means such that said time interval is the time necessary for said acoustical energy to travel twice the distance between said door leading edge and said strike post.*

*35. In an elevator system as claimed in claim 34 and further including means for varying said predetermined zone for operation of said first transmitting and receiving means.*

*36. A safety system for preventing the full closure of an automatically operated sliding door, the door being movable from an open position to a closed position against a strike post and having a leading edge, said safety system comprising:*

*electrical means for sensing and being responsive to objects in a predetermined zone at any position of the door, whereby upon detecting an object in said zone said electrical means generates a signal for preventing further closure of the door, said sensing means including*

*first transmitting and receiving means for locating a leading edge of the door relative to the strike post; and*

*second transmitting and receiving means positioned at a predetermined angle on the leading edge of the door in cooperation with said locating means for detecting objects at an angle substantially greater than zero with respect to an outside surface of the car door during movement of the car door.*

*37. A safety system as claimed in claim 36 and further including means for providing each of said transmitting means with acoustic wave energy, and means for each of said receiving means for receiving reflection of said transmitted acoustic energy.*

*38. A safety system as claimed in claim 36 wherein said acoustic wave energy is constituted by a series of short bursts of acoustic wave pulses of a single predetermined frequency with comparatively large time gaps between bursts.*

*39. A safety system as claimed in claim 38 and further including means for establishing as a timing signal said time gap between bursts provided to said first transmitting means; and including means for rendering said second transmitting and receiving means effective upon detection of an object in its path in preventing closure of said car door when signal received from said preceding object occurs before expiration of said time gap of said timing signal.*

*40. A safety system as claimed in claim 39 and further including means for varying said predetermined zone for operation of said second transmitting and receiving means.*

*41. The method of detecting presence of an intervening object positioned in the path of a moving door that has a leading edge and which moves towards a strike post, the method comprising:*

*transmitting short bursts of acoustic wave energy from the leading edge of the door;*

*monitoring for the reception of reflections of said acoustic energy;*

*locating the leading edge of the door relative to the strike post by determining a time interval that is equal to the time necessary for said acoustical energy to travel twice the distance between the leading edge of the door and the strike post; and*

*determining whether any received reflections were received during said time interval, which is indicative of detection of an intervening object.*

*42. The method as claimed in claim 41 wherein said acoustic wave energy is transmitted in a straight path between the leading edge of the door and the strike post for detection of an intervening object in said path.*

*43. The method as claimed in claim 41 wherein said acoustic wave energy is transmitted in an angular path with respect to line of movement of the door for detection of an intervening object in said path.*

*44. The method as claimed in claim 43 and further including transmitting further short bursts of acoustic wave energy in a straight path from the leading edge of the door toward the strike post for detection of a further intervening object in said straight path; monitoring for the reception of reflections of said further acoustic energy; and determining whether any received reflections of said further acoustic energy were received during said time interval which is indicative of an intervening object.*

*45. The method as claimed in claim 44 and further including stopping the movement of the door whenever an intervening object is determined.*

*46. The method as claimed in claim 41 and further including rendering said determining step effective to stop the movement of the door only when the reflected signal is received at least a predetermined amount of time before the expiration of said time interval.*

* * * * *